(12) United States Patent
Liu et al.

(10) Patent No.: US 10,878,005 B2
(45) Date of Patent: Dec. 29, 2020

(54) CONTEXT AWARE DOCUMENT ADVISING

(71) Applicant: International Business Machines Corporation, Armonk, NY (US)

(72) Inventors: Tao Liu, Dublin, OH (US); Teng Sun, Beijing (CN); Athar Tayyab, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 16/159,988

(22) Filed: Oct. 15, 2018

(65) Prior Publication Data

US 2020/0117752 A1 Apr. 16, 2020

(51) Int. Cl.
| | | |
|---|---|---|
| *G06F 16/332* | (2019.01) | |
| *G06F 16/33* | (2019.01) | |
| *G06F 16/34* | (2019.01) | |
| *G06F 16/38* | (2019.01) | |

(52) U.S. Cl.
CPC ........ *G06F 16/332* (2019.01); *G06F 16/3323* (2019.01); *G06F 16/3344* (2019.01); *G06F 16/34* (2019.01); *G06F 16/38* (2019.01)

(58) Field of Classification Search
CPC .................................................. G06F 16/332
See application file for complete search history.

(56) References Cited

U.S. PATENT DOCUMENTS

| | | | |
|---|---|---|---|
| 8,479,094 B2 | 7/2013 | Fouts | |
| 8,959,109 B2* | 2/2015 | Scott | G06F 16/332 |
| | | | 707/769 |
| 9,218,344 B2* | 12/2015 | Al-Kofahi | G06F 40/169 |
| 9,740,737 B2 | 8/2017 | Zupancic | |
| 2004/0268236 A1 | 12/2004 | Chidlovskii | |
| 2007/0266095 A1* | 11/2007 | Billsus | G06Q 10/10 |
| | | | 709/204 |
| 2008/0077558 A1* | 3/2008 | Lawrence | G06F 40/279 |
| 2011/0060761 A1* | 3/2011 | Fouts | G06F 40/205 |
| | | | 707/770 |
| 2011/0078570 A1* | 3/2011 | Larsen | G16H 10/60 |
| | | | 715/710 |
| 2011/0184960 A1* | 7/2011 | Delpha | G06F 40/169 |
| | | | 707/754 |

(Continued)

FOREIGN PATENT DOCUMENTS

| | | |
|---|---|---|
| JP | 2007102767 B2 | 4/2007 |
| WO | 20161796831 A1 | 11/2016 |

OTHER PUBLICATIONS

Melguizo et al., "A Proactive Recommendation System for Writing: Helping Without Disrupting," International Journal of Industrial Ergonomics 39 (2009), pp. 516-523.

*Primary Examiner* — William Spieler
(74) *Attorney, Agent, or Firm* — VanLeeuwen & VanLeeuwen; Christopher M. Pignato (57) ABSTRACT

An approach is provided in which an information handling system determines a current focus of a user composing a document. The current focus is based on a set of text in proximity to a current cursor location in the document. Next, the information handling system identifies a query based at least in part upon the current focus and queries a database using the identified query. In turn, the information handling system presents reference recommendations to the user that are generated from the query.

20 Claims, 8 Drawing Sheets

(56) References Cited

U.S. PATENT DOCUMENTS

| | | | |
|---|---|---|---|
| 2012/0030553 A1* | 2/2012 | Delpha | G06F 40/169 |
| | | | 715/205 |
| 2013/0080449 A1 | 3/2013 | Chung | |
| 2013/0275429 A1 | 10/2013 | York | |
| 2017/0083483 A1 | 3/2017 | Wang | |
| 2018/0101599 A1* | 4/2018 | Arnold | G06F 16/338 |
| 2018/0357611 A1* | 12/2018 | Soni | G06Q 10/109 |
| 2019/0138645 A1* | 5/2019 | Zhang | G06F 16/24575 |
| 2019/0340202 A1* | 11/2019 | Kandur Raja | G06F 40/30 |
| 2020/0097340 A1* | 3/2020 | Balik | G06N 20/00 |
| 2020/0097586 A1* | 3/2020 | Balik | G06F 40/103 |

\* cited by examiner

Existing methods for interactive image retrieval have demonstrated the merit of integrating user feedback, improving retrieval results. However, most current systems rely on restricted forms of user feedback, such as binary relevance responses, or feedback based on a fixed set of relative attributes, which limits their impact.

In this paper, we introduce a new approach to interactive image search that enables users to provide feedback via natural language, allowing for more natural and effective interaction. We formulate the task of dialog-based interactive image retrieval as a reinforcement learning problem, and reward the dialog system for improving the rank of the target image during each dialog turn.

To avoid the cumbersome and costly process of collecting human-machine conversations as the dialog system learns, we train our system with a user simulator, which is itself trained to describe the differences between target and candidate images. The efficacy of our approach is demonstrated in a footwear retrieval application.

Capturing images dates back to the invention of the camera. The history of photography has roots in remote antiquity with the discovery of two critical principles, that of the camera obscura image projection and the fact that some substances are visibly altered by exposure to light, as discovered by Current Focus Window 720

Cursor 710

CONTEXT AWARE DOCUMENT ADVISING

BACKGROUND

Authors generate documents pertaining to academia, business, government, law, and etcetera. Types of generated documents include manuscripts, thesis papers, journals, proposals, contracts, nondisclosure agreements (NDA), technical papers, user guides, briefs, summons, white papers, patent applications, and etcetera.

Regardless of the document type, document writing usually requires an author to search, gather and evaluate prior work pertaining to a subject, especially if the author is unfamiliar with certain topics. Unfortunately, the author usually spends an enormous amount of time researching prior work to locate references that is specific to the user's context. The author typically performs a search on a few key words and receives an overwhelming amount of hits. Then, the author adds more keywords to the search to narrow down the possible results, all the while possibly going down a search path that is not optimum for the context of the author's document.

The concepts of "attention" and "focus," as these words relate to human thought are known. For purposes of this document, "attention" is hereby defined as the behavioral and cognitive process of selectively concentrating on a discrete aspect of information, whether deemed subjective or objective, while ignoring other perceivable information. "Attention" typically involves the taking possession by the mind in clear and vivid form of one out of what seem several simultaneous objects or trains of thought. "Focus" is hereby defined as the discrete aspect of information, object and/or train of thought that currently subject to an individual's attention. While attention and focus cannot typically be directly detected, an individual's attention and, following from that, the object of the individual's attention (that is, the focus) can be typically be indirectly detected by various types of observations, typically observations of the individual. One very simple example is that if a user says, "I am thinking about wombats," then the individual's focus is considered to be wombats. A slightly less direct example might be an individual standing next to a trophy that the individual has been awarded for a victory in a competition. Even if the individual is not looking at the trophy, but instead is smiling broadly and staring into the middle distance, it is still fairly inferable from the circumstances that the focus of the individual is the trophy and/or the victory in the competition.

BRIEF SUMMARY

According to one embodiment of the present disclosure, an approach is provided in which an information handling system determines a current focus of a user composing a document. The current focus is based on a set of text in proximity to a current cursor location in the document. Next, the information handling system identifies a query based at least in part upon the current focus and queries a database using the identified query. In turn, the information handling system presents reference recommendations to the user that are generated from the query.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) determining a current focus of a user composing a document, wherein the current focus is based on a set of text in proximity to a current cursor location in the document; (ii) querying a database using a query that is based at least in part upon the current focus, wherein the querying identifies one or more reference recommendations; and (iii) presenting the one or more reference recommendations to the user.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
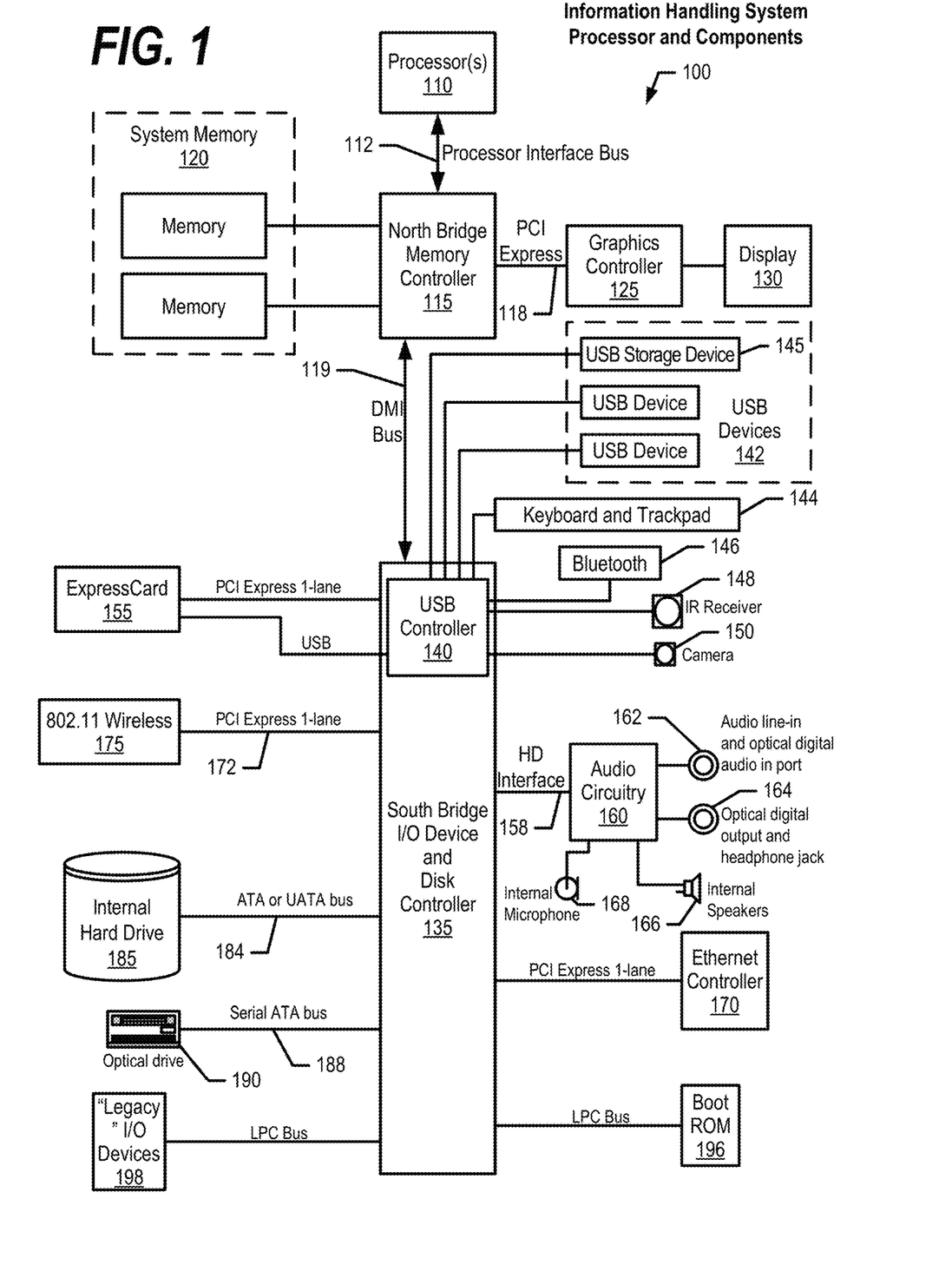
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119.

In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
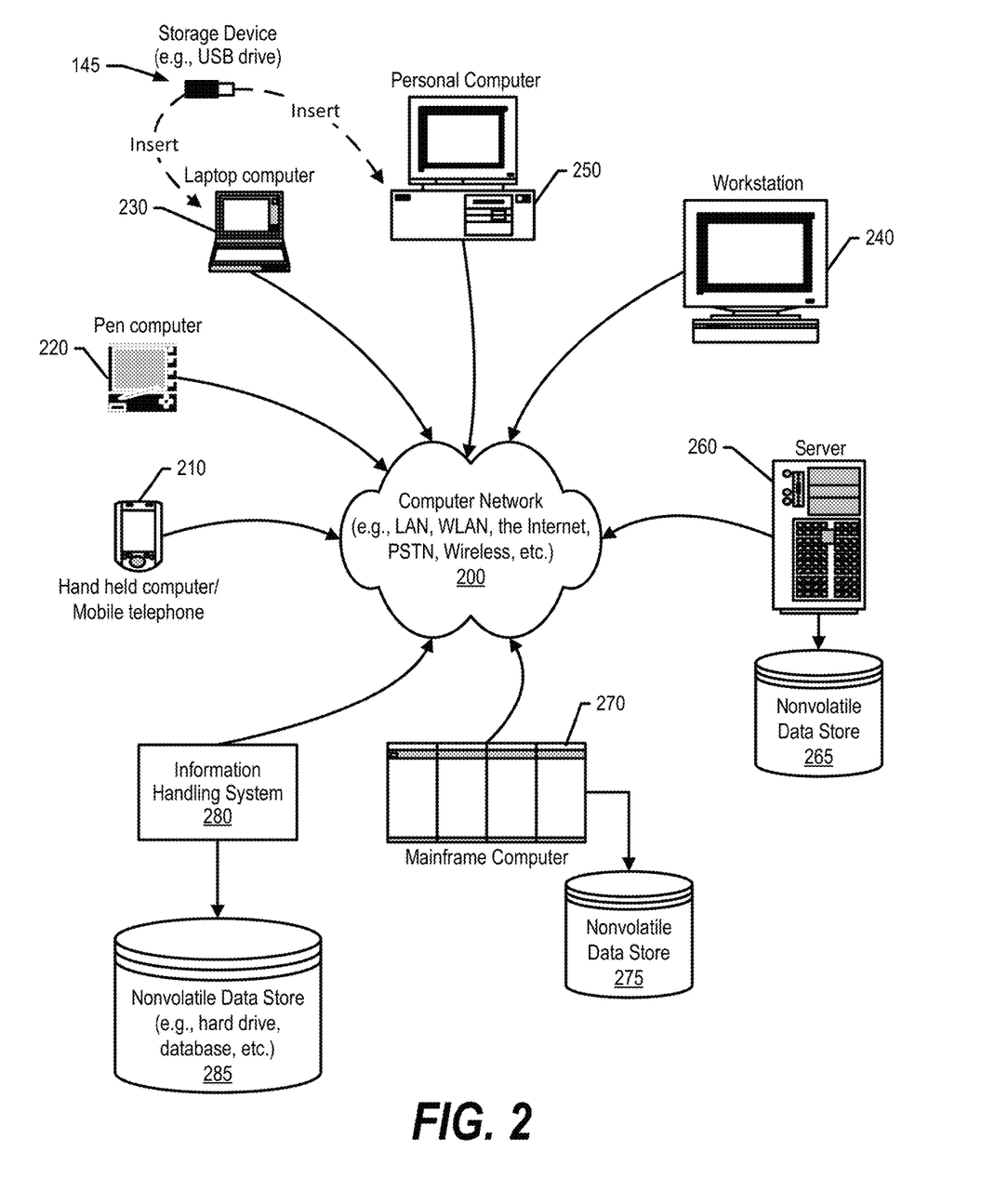
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable non-volatile storage device 145 to a USB port or other connector of the information handling systems.

As discussed above, authors composing a document usually spend a substantial amount of time researching prior work to reference in a document. FIGS. 3 through 8 depicting an approach that can be implemented on an information handling system that streamlines these steps by determining a current focus of a user and presenting recommendations to the user based on the user's current focus. The information handling system proposes document samples and references, detects and advises based on current context, and provides full text based refinement suggestions.

In one embodiment, high level steps that the information handling system performs include 1) defining a document type and selecting relevant tags; 2) specifying a title based on suggested pattern and example; 3) composing an outline based on a suggested template; 4) adding content to the document based on context aware supporting materials; and 5) improving the document based on refinement suggestions.

Some embodiments are based content suggestions, at least in part, on various kinds of context information. Some possible types of context which may be used in various embodiments include the following: (i) temporal context (for example, what time of day, week, month or year is the author drafting the document, is the author drafting the document just before a holiday, etc.); (ii) locational context (for example, in what nation, state or city is the author drafting the document, is the author in a large city or a rural area, etc.); (iii) weather context (what is the present weather conditions when the author is drafting the document, what is the weather forecast for the author's locale, etc.); (iv) event based context (for example, is the author at her place of work, on a boat trip, in the lobby of a movie theater, etc.); and (v) subject matter context (that is, subject matter that author is writing about, or having a telephone conversation about, for example, the system may detect that the author is writing about professional issues and opposed to family issues).

Figure 3:
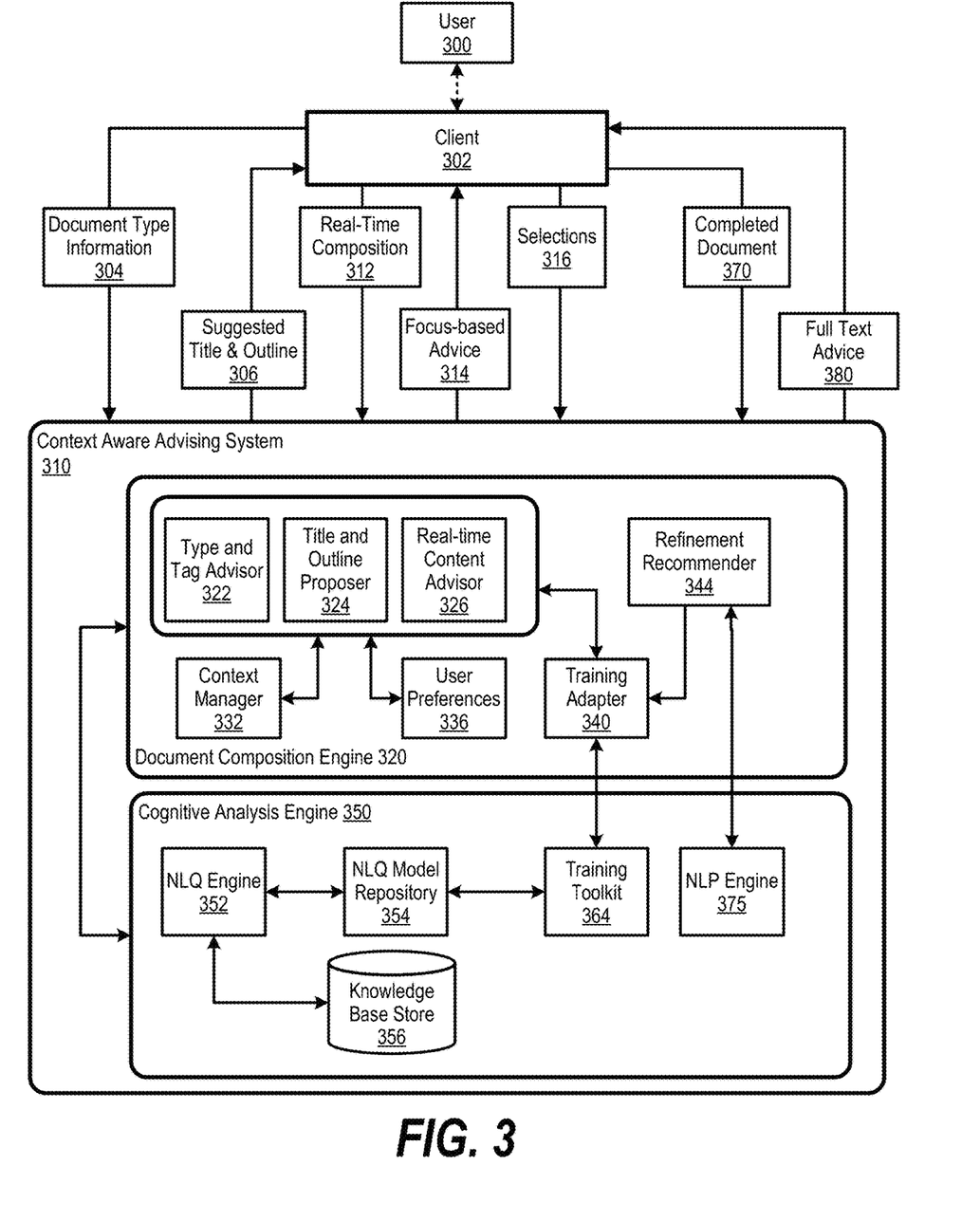
FIG. 3 is an exemplary diagram of a context aware advising system that provides real-time document recommendations based on a current composition focus of a user.

FIG. 3 is an exemplary diagram of a context aware advising system that provides real-time document recommendations based on a current composition focus of a user. Context aware advising system 310 includes document composition engine 320 and cognitive analysis engine 350. Document composition engine 320 analyzes a current focus of a user's composition and provides guidance pertaining to a document title, a document outline, inserting reference text, and final document analysis. The current focus of the user is based on a set of text in proximity to a current cursor position of the author (e.g., current sentence being edited, current paragraph being edited). In one embodiment, context aware advising system 310 sets a default current focus window of a paragraph and allows the user to expand or shrink the current focus window to, for example, a sentence, a page, a word, a chapter, and etcetera.

User 300 defines a document type (edits the title/outline/content) via client 304 and provides document type information 304 to context aware advising system 310. Title and outline proposer 324 evaluate document type information 304 and provides suggested title and outline 306 to user 300 (see FIG. 5 and corresponding text for further details). In addition, in one embodiment, type and tag advisor 322 sends relevant tags, based on document type information 304, to natural language query (NLQ) engine 352. NLQ engine, in turn, identifies and uses a subset of knowledge base store 356 (target knowledge base) to search during the real-time document analysis steps (see FIG. 5 and corresponding text for further details).

User 300 begins to write a document (real-time composition 312), which is fed to context aware advising system 310 via client 302. Context aware advising system 310 captures the context of real-time composition 312 in context manager 332. Document composition engine 320 determines the current focus of user 300 by evaluating the set of text in the current focus window (e.g., paragraph), and sends the current focus to cognitive analysis engine 350. In one embodiment, document composition engine 320 sends a composed query based on the current focus, such as "What are the most popular solutions and products being used as BigData solution in the banking industry?"

NLQ engine 352, in one embodiment, selects an NLQ model in NLQ model repository 354 based on a particular domain. For example, when a document type is determined (e.g., business proposals, technical papers, white papers), then NLQ engine 352 chooses corresponding NLQ methodologies to match the characteristics of that domain.

NLQ engine 352 uses the selected NLQ model to search the target knowledge base identified in knowledge base store 356 to find relevant references. Cognitive analysis engine 350 then sends advice results generated from NLQ engine 352 back to document composition engine 320 for further analysis by real-time content advisor 326. Real-time content advisor 326, in one embodiment, ranks the relevant references based on, for example, context manager 332 and user preferences 336. For example, user 300 may specify that only references later than 1980 are provided to user 300. Context aware advising system 310 then sends focus-based advice 314 back to user 300 based on real-time content advisor 326's analysis.

Figure 6:
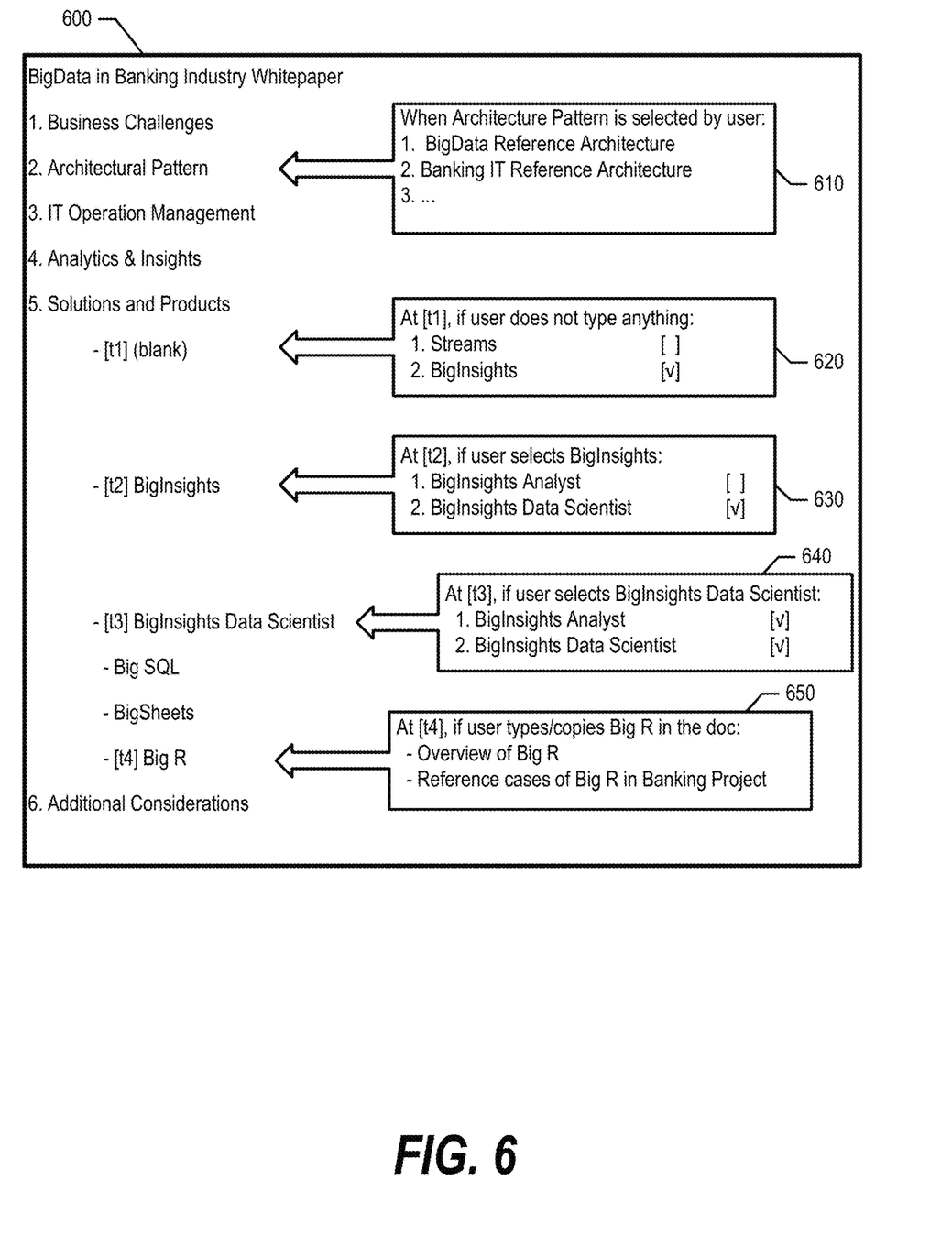
FIG. 6 is an exemplary diagram depicting recommendations overlaid onto a user's selected outline.

Client 302, in one embodiment, overlays the advice information onto the user 300's document (see FIG. 6 and corresponding text for further details). User 300 makes selections on the advice and client 302, if selected, adds reference content to the user's document and sends selections 316 to context aware advising system 310. Context aware advising system 310 stores selections 316 and focus-based advice 375 in training adapter 340 to learn from user 300's selections. For example, user 300 may select international articles over local articles and, in turn, training adapter 340 informs real-time content advisor 326 to rank international articles higher than local articles in subsequent advice. Training adapter 340 also reformats the document metadata, advice information, user's selection, etc. according to an interface exposed by training toolkit 364 and sends the transformed data to training toolkit 364. Training toolkit 364 periodically executes to refine the NLQ models in NLQ model repository 360 based on the user's selections.

Context aware advising system 310 continues to monitor real-time composition 312, provide focus-based advice 314, and receive selections 316 until user 300 is finished writing the document. At this point, client 302 provides completed document 370 to context aware advising system 310. Refinement recommender 344 analyzes completed document 370 as a whole (full text) and sends completed document 370 to natural language processing (NLP) engine 368. NLP engine 375 evaluates completed document 370 and sends recommendations back to refinement recommender 344. Refinement recommender 344, in turn, sends full text advice 380 to user 300 via client 304 that, in one embodiment, includes document consistency reviews, opposite opinion reviews, and sentiment analysis reviews (see FIG. 8 and corresponding text for further details).

Figure 4:
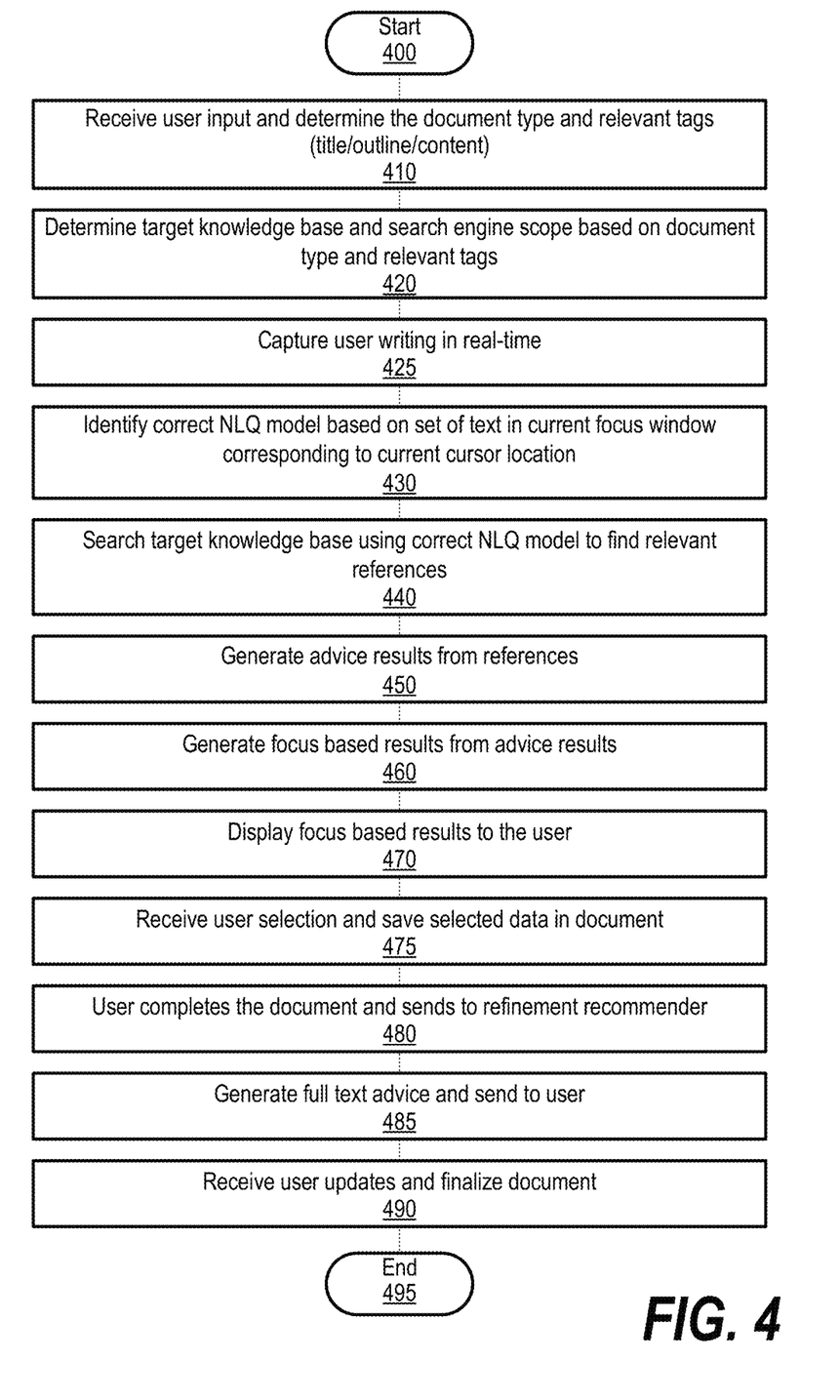
FIG. 4 is an exemplary flowchart showing steps taken by a context aware advising system to provide real-time content advice to a user based on the user's current focus in a composition.

FIG. 4 is an exemplary flowchart showing steps taken by context aware advising system 310 to provide real-time content advice to a user based on the user's current focus in a composition. FIG. 4 processing commences at 400 whereupon, at step 410, the process receives user input and the process determines the document type and relevant tags (title/outline/content) from the user input. At step 420, the process determines a target knowledge base and search engine scope based on the document type and relevant tags.

At step 425, the process captures the user's writing in real-time and, at step 430, the process identifies a correct NLQ model based on the set of text in the current focus window corresponding to the user's current cursor location. As discussed earlier, the current focus window is based on the current cursor location (e.g., row x, column y), and the current focus window size, in one embodiment, is reconfigurable (e.g., word, sentence, paragraph, etc.).

At step 440, the process searches the target knowledge base using the selected NLQ model to find specific references. At step 450, the process generates advice results from references. In one embodiment, the sentence/expression around the focus is used as keywords to search references, and its parent section/paragraph and other supporting data in the document is used to setup the context information to filter and rank the relevant references.

At step 460, the process generates focus based results from the advice results. In one embodiment, the process selects the top N results from the suggested references and displays the top N references on the right side of the user's display for the user to select (step 470).

At step 475, the process receives a user selection and the process saves the selected data into the user's document. At step 480, the process receives an indication that the user has completed writing the document, in which case the process sends the document to refinement recommender 344. At step 485, the process generates full text advice for the document and sends the full text advice to the user (see FIG. 8 and corresponding text for further details). At step 490, the process receives user updates based on the full text advice and finalizes the document. FIG. 4 processing thereafter ends at 495.

Figure 5:
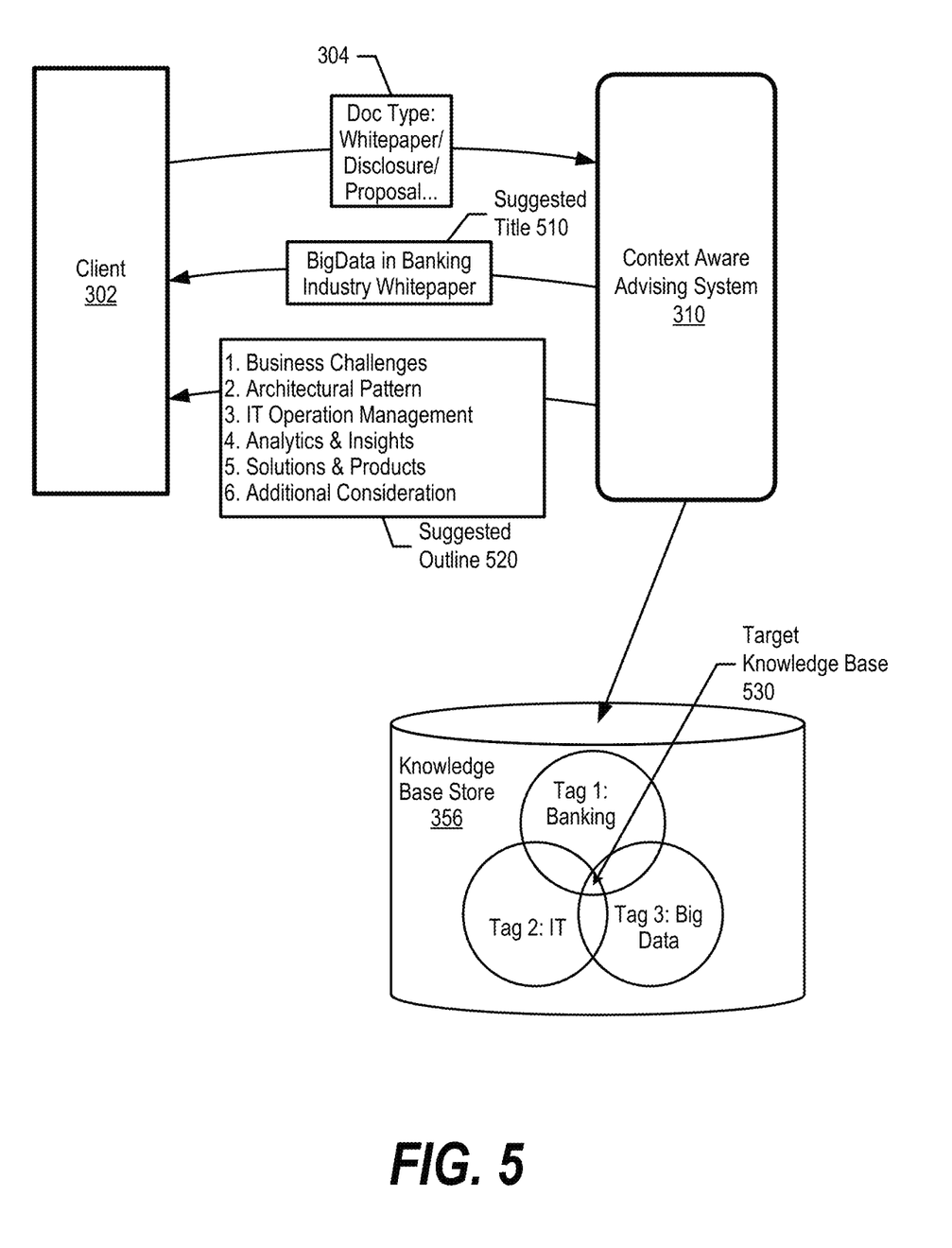
FIG. 5 is an exemplary diagram depicting a context aware advising system proposing a title and outline based on information provided by a user.

FIG. 5 is an exemplary diagram depicting context aware advising system 310 proposing a title and outline based on information provided by a user. User 300, via client 302, sends document type information 304 to context aware advising system 310. Document type information includes the type of document the user wishes to write (whitepaper) and also includes information to the type of paper (banking, IT, big data).

Context aware advising system 310 selects target knowledge base 530 as the area to search in knowledge base store 356 for real-time searches, and also provides suggested title 510 and outline 520 to the user (i.e. suggested title and outline 306). In turn, user 300 selects the suggested title and outline and is input to the user's document. User 300 begins to write and context aware advising system 310 monitors and provides real-time recommendations accordingly (see FIG. 6 and corresponding text for further details).

FIG. 6 is an exemplary diagram depicting recommendations overlaid onto a user's selected outline. In one embodiment, when user 300 begins to make various selections in the overlays (windows 610, 620, 630, 640, and 650), context aware advising system 310 inserts text into the document based on the user selection. In one embodiment context aware advising system 310 provides content details on the right side of display 600 while user 300 enters keywords in the document. The user's selection is then used as feedback to improve context aware advising system 310's suggestion rankings.

Figure 7:
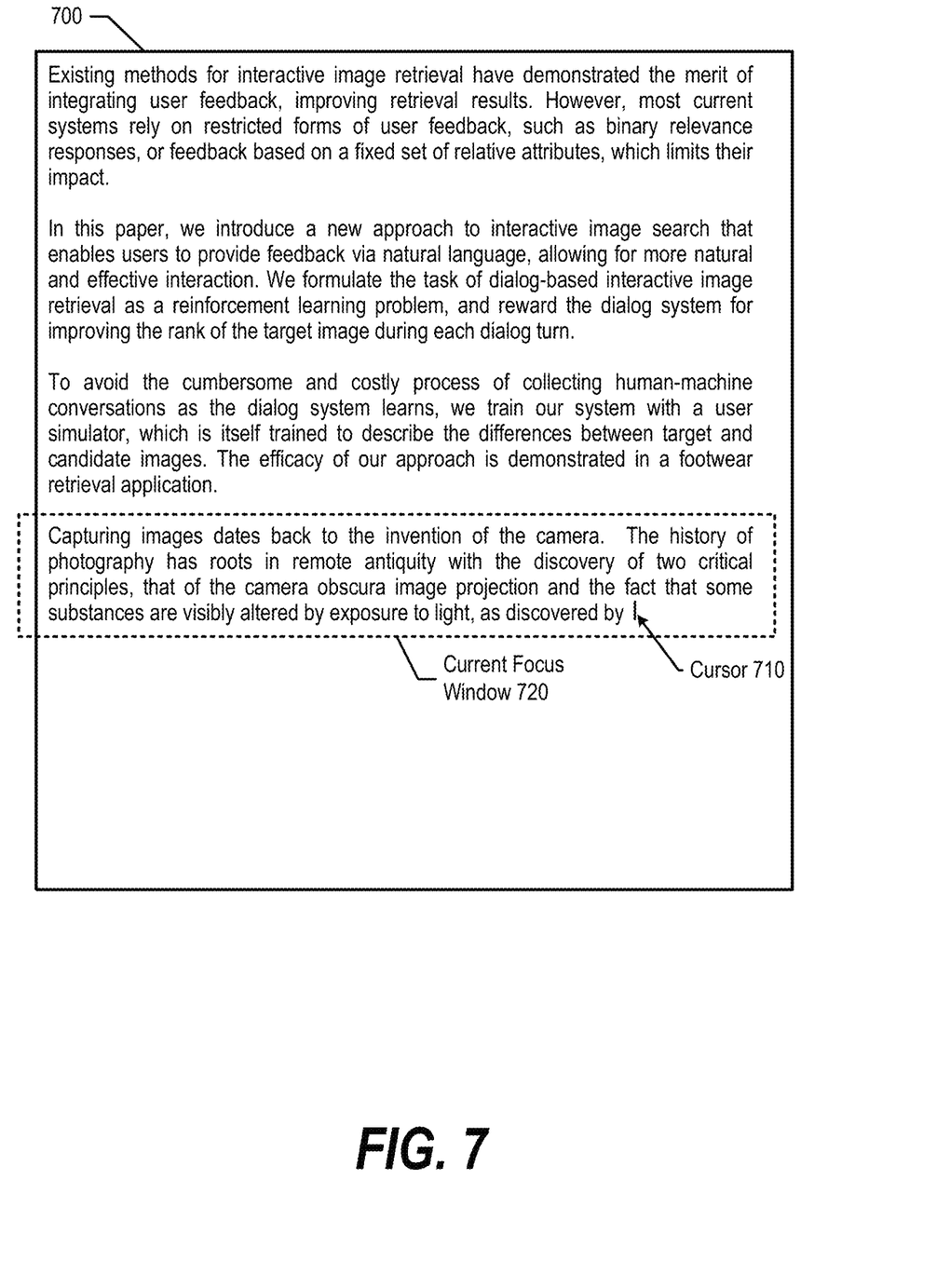
FIG. 7 is a diagram depicting a current cursor location and current focus window of a user.

FIG. 7 is a diagram depicting a current cursor location and current focus window of a user. User 300 is composing document 700, which relates to digital image searches. While writing the document, however, user 300 begins describing the history of cameras (fourth paragraph). Context aware advising system 310 detects this change by identifying the location of cursor 710 and analyzing the set of text in current focus window 720. In turn, context aware advising system 310 provides suggestions based on the history of photography (fourth paragraph) instead of providing suggestions based on the entire text in document 700.

Figure 8:
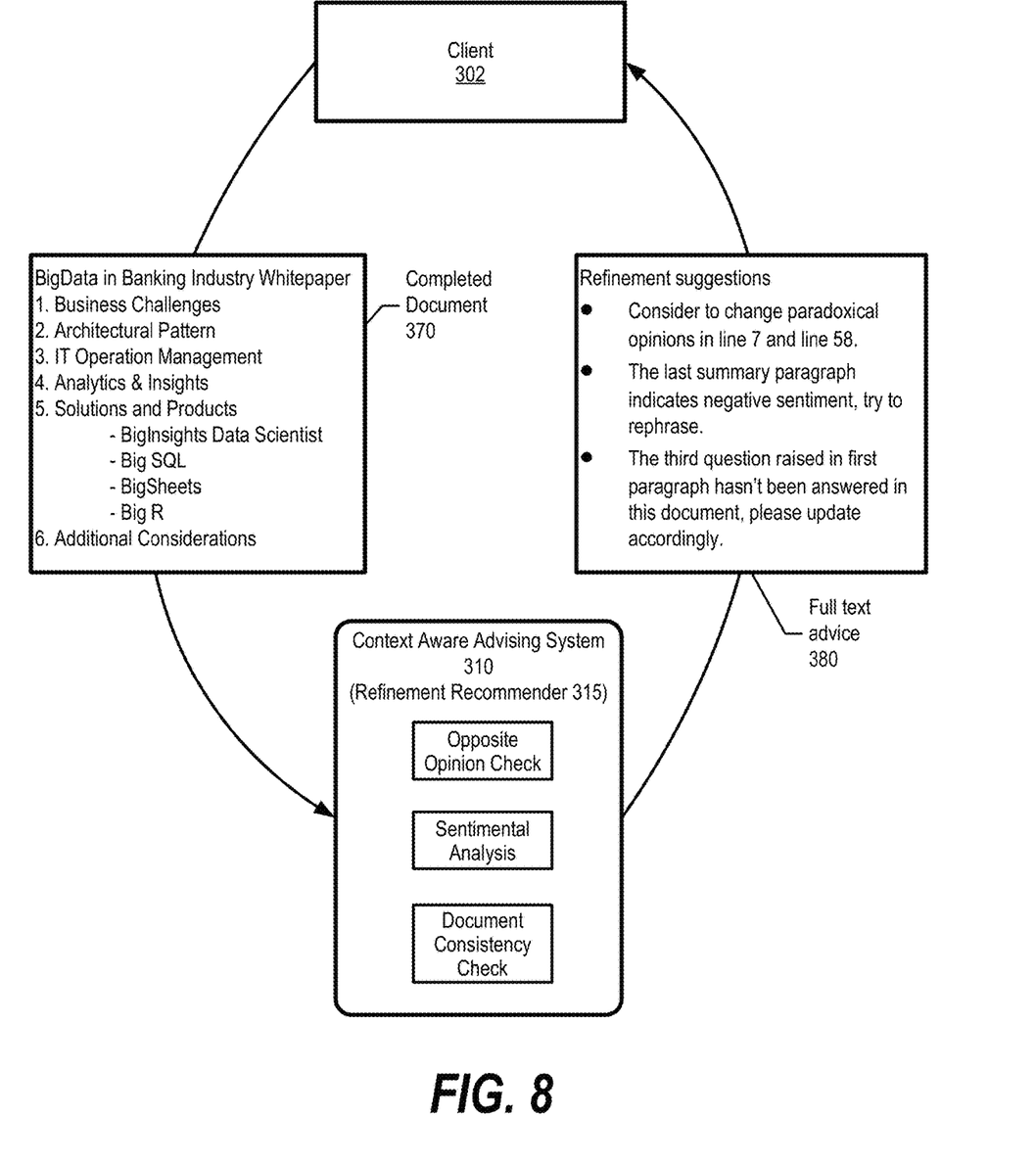
FIG. 8 is an exemplary diagram showing a context aware advising system analyzing a final document and providing refinement suggestions.

FIG. 8 is an exemplary diagram showing a context aware advising system analyzing a final document and providing refinement suggestions. Context aware advising system 310's final step, in one embodiment, is to conduct an opposite opinion check, sentiment analysis, and consistency check across completed document 370. Refinement recommender 315 uses NLP engine 375 to evaluate completed document 370 and generate refinement suggestions accordingly (full text advice 380). In one embodiment, based on NLP semantic and sentiment analysis, refinement recommender 315 understands the key opinions in the document, compares and checks the opposite and inconsistent items, also reviews the positive/negative sentiment of each paragraph. In turn, client 302 presents full text advice 380 to user 300 to revise the document accordingly.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    receiving a selection by a user that selects one of a plurality of predetermined sizes of a current focus window;
    capturing a set of text in a document based on a current cursor location and the selected size of the current focus window;
    querying a database using a query that is based at least in part upon the set of text, wherein the querying identifies one or more reference recommendations; and presenting the one or more reference recommendations to the user.

2. The method of claim 1 further comprising:
receiving a selection from the user in response to presenting the one or more reference recommendations;
inserting a set of reference text into the document based on the user selection;
adjusting a set of suggestion rankings based on the user selection; and
presenting one or more new reference recommendations to the user based on the adjusted set of suggestion rankings.

3. The method of claim 1 wherein the set of text is constrained by the current focus window that omits a portion of text in the document, and wherein the size of the current focus window is selected from the group consisting of a word, a sentence, a paragraph, a section, and a chapter.

4. The method of claim 1 further comprising:
prior to the user composing the document, receiving a set of document information from the user;
determining a document type and one or more document subject constraints based on the set of document information; and
providing a document title suggestion and a document outline suggestion to the user based on the document type and the one or more document subject constraints.

5. The method of claim 4 further comprising:
reducing the database to a target database based on the one or more document subject constraints; and
performing the querying on the reduced database.

6. The method of claim 1 further comprising:
analyzing a completed document received from the user, wherein the analyzing comprises, on a full set of text in the completed document, a sentiment analysis and a document consistency analysis; and
providing one or more document refinement suggestions to the user based on the analysis.

7. The method of claim 1 further comprising:
overlaying one or more overlays on the document that comprises a set of selection criteria corresponding to the one or more reference recommendations; and
receiving the user selection based on a selection of the set of selection criteria.

8. An information handling system comprising:
one or more processors;
a memory coupled to at least one of the processors;
a set of computer program instructions stored in the memory and executed by at least one of the processors in order to perform actions of:
receiving a selection by a user that selects one of a plurality of predetermined sizes of a current focus window;
capturing a set of text in a document based on a current cursor location and the selected size of the current focus window;
querying a database using a query that is based at least in part upon the set of text, wherein the querying identifies one or more reference recommendations; and
presenting the one or more reference recommendations to the user.

9. The information handling system of claim 8 wherein the processors perform additional actions comprising:
receiving a selection from the user in response to presenting the one or more reference recommendations;
inserting a set of reference text into the document based on the user selection;
adjusting a set of suggestion rankings based on the user selection; and
presenting one or more new reference recommendations to the user based on the adjusted set of suggestion rankings.

10. The information handling system of claim 8 wherein the set of text is constrained by the current focus window that omits a portion of text in the document, and wherein the size of the current focus window is selected from the group consisting of a word, a sentence, a paragraph, a section, and a chapter.

11. The information handling system of claim 8 wherein the processors perform additional actions comprising:
prior to the user composing the document, receiving a set of document information from the user;
determining a document type and one or more document subject constraints based on the set of document information; and
providing a document title suggestion and a document outline suggestion to the user based on the document type and the one or more document subject constraints.

12. The information handling system of claim 11 wherein the processors perform additional actions comprising:
reducing the database to a target database based on the one or more document subject constraints; and
performing the querying on the reduced database.

13. The information handling system of claim 8 wherein the processors perform additional actions comprising:
analyzing a completed document received from the user, wherein the analyzing comprises, on a full set of text in the completed document, a sentiment analysis and a document consistency analysis; and
providing one or more document refinement suggestions to the user based on the analysis.

14. The information handling system of claim 8 wherein the processors perform additional actions comprising:
overlaying one or more overlays on the document that comprises a set of selection criteria corresponding to the one or more reference recommendations; and
receiving the user selection based on a selection of the set of selection criteria.

15. A computer program product stored in a computer readable storage medium, comprising computer program code that, when executed by an information handling system, causes the information handling system to perform actions comprising:
receiving a selection by a user that selects one of a plurality of predetermined sizes of a current focus window;
capturing a set of text in a document based on a current cursor location and the selected size of the current focus window;
querying a database using a query that is based at least in part upon the set of text, wherein the querying identifies one or more reference recommendations; and
presenting the one or more reference recommendations to the user.

16. The computer program product of claim 15 wherein the information handling system performs further actions comprising:
receiving a selection from the user in response to presenting the one or more reference recommendations;
inserting a set of reference text into the document based on the user selection;
adjusting a set of suggestion rankings based on the user selection; and presenting one or more new reference recommendations to the user based on the adjusted set of suggestion rankings.

17. The computer program product of claim 15 wherein the set of text is constrained by the current focus window that omits a portion of text in the document, and wherein the size of the current focus window is selected from the group consisting of a word, a sentence, a paragraph, a section, and a chapter.

18. The computer program product of claim 15 wherein the information handling system performs further actions comprising:

prior to the user composing the document, receiving a set of document information from the user;

determining a document type and one or more document subject constraints based on the set of document information; and providing a document title suggestion and a document outline suggestion to the user based on the document type and the one or more document subject constraints.

19. The computer program product of claim 18 wherein the information handling system performs further actions comprising:

reducing the database to a target database based on the one or more document subject constraints; and performing the querying on the reduced database.

20. The computer program product of claim 15 wherein the information handling system performs further actions comprising:

analyzing a completed document received from the user, wherein the analyzing comprises, on a full set of text in the completed document, a sentiment analysis and a document consistency analysis; and providing one or more document refinement suggestions to the user based on the analysis.

\* \* \* \* \*